United States Patent [19]

Suzuki

[11] 4,233,635
[45] Nov. 11, 1980

[54] HIGH VOLTAGE LIMITING CIRCUIT FOR A TELEVISION RECEIVER

[75] Inventor: Masao Suzuki, Tokyo, Japan
[73] Assignee: Sony Corporation, Tokyo, Japan
[21] Appl. No.: 966,128
[22] Filed: Dec. 4, 1978
[30] Foreign Application Priority Data Dec. 7, 1977 [JP] Japan ............... 52/164302[U]

[51] Int. Cl.³ ............................... H04N 5/68; H01J 29/70
[52] U.S. Cl. ........................................... 358/243; 315/411
[58] Field of Search .......................... 358/243; 315/411

[56] References Cited

U.S. PATENT DOCUMENTS

| | | | |
|---|---|---|---|
| 3,611,002 | 10/1971 | Wedam | 358/243 |
| 3,970,780 | 7/1976 | Minoura | 315/411 |
| 4,058,754 | 11/1977 | Ohnishi et al. | 358/243 |
| 4,074,323 | 2/1978 | Griffey | 358/243 |
| 4,090,111 | 5/1978 | Suzuki | 358/243 |
| 4,126,816 | 11/1978 | Willis | 358/243 |

Primary Examiner—John C. Martin
Assistant Examiner—Edward L. Coles
Attorney, Agent, or Firm—Lewis H. Eslinger; Alvin Sinderbrand

[57] ABSTRACT

A high voltage limiting circuit for a television receiver employs a negative pulse sample from a tertiary winding on a flyback transformer as a measure of high voltage. When the amplitude of the negative pulse sample exceeds a predetermined value, indicating excessive high voltage, a limiting circuit applies a voltage to an automatic frequency control input of a horizontal oscillator to increase the frequency of the horizontal oscillator. The increased frequency limits further increase in high voltage.

5 Claims, 2 Drawing Figures

HIGH VOLTAGE LIMITING CIRCUIT FOR A TELEVISION RECEIVER

BACKGROUND OF THE INVENTION

1. Field of the Invention

This invention relates generally to a high voltage limiting circuit for a television receiver and is directed more particularly to a high voltage limiting circuit for use with a television receiver which is simple in circuit construction but effective in operation.

2. Description of the Prior Art

In prior art color television receivers, when the high voltage produced in the fly-back transformer becomes too high, dangerous X-rays may be generated.

OBJECTS AND SUMMARY OF THE INVENTION

It is an object of the present invention to provide a novel high voltage limiting circuit for use with a television receiver.

It is another object of the invention to provide a high voltage limiting circuit for a color television receiver which will prevent the increase of high voltage generated in a fly-back transformer and hence will prevent X-rays from being generated.

According to an aspect of the present invention there is provided a high voltage limiting circuit for use with a television receiver which comprises a horizontal oscillator having a frequency controlled by an automatic frequency control voltage, an output circuit driven by an output pulse from the horizontal oscillator, a fly-back transformer having a primary winding connected to an output of the output circuit, a secondary winding and a tertiary winding, a high voltage rectifying circuit connected to the secondary winding of the fly-back transformer, a voltage dividing circuit between a terminal of the tertiary winding and a reference potential, and a transistor having an emitter connected to the reference potential, a base connected to the voltage dividing circuit through a constant voltage device and a collector connected to add a voltage to the automatic frequency control voltage controlling the frequency of the horizontal oscillator, and the tertiary winding of the fly-back transformer being wound to produce a negative pulse and the reference potential being a positive voltage whereby the added voltage is effective to control the frequency of the horizontal oscillator so as to reduce a high voltage obtained at the high voltage rectifying circuit when a voltage of the negative pulse exceeds a predetermined value.

The other objects, features and advantages of the present invention will become apparent from the following description taken in conjunction with the accompanying drawings.

DESCRIPTION OF THE PREFERRED EMBODIMENT

Figure 1:
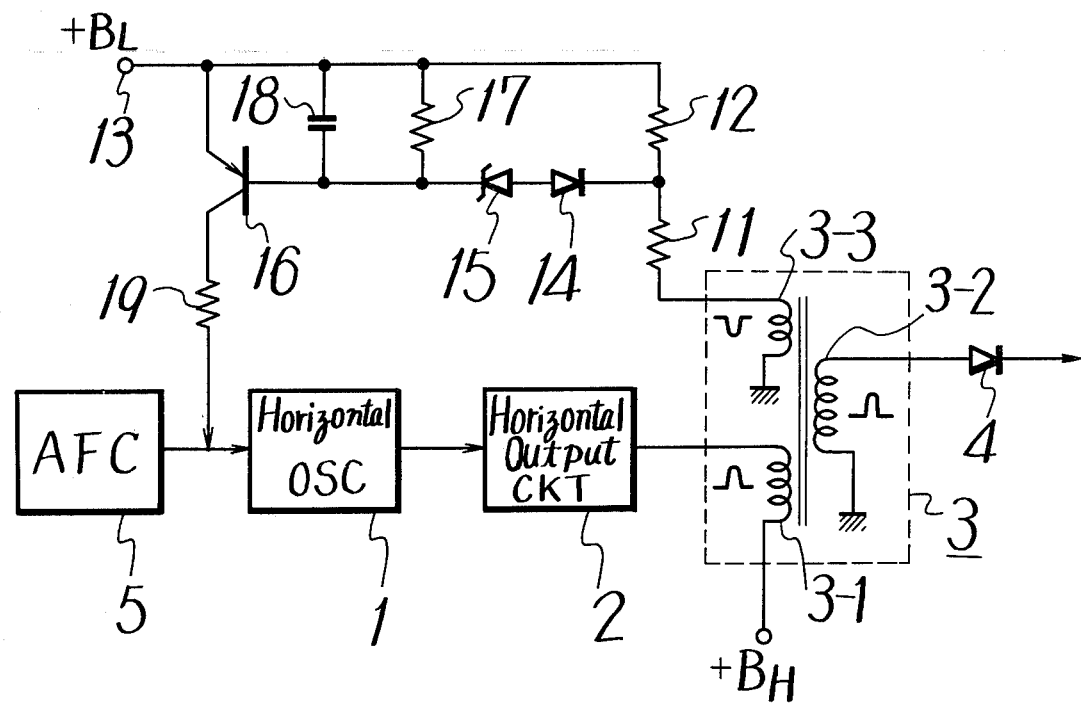
FIG. 1 is a block and schematic diagram of a high voltage limiting circuit for use with a television receiver according to an embodiment of the present invention.

Turning to FIG. 1, a horizontal oscillator 1 produces an output pulse signal which is applied to an input of a horizontal output circuit 2. A horizontal pulse, produced by horizontal output circuit 2, is applied to a primary winding 3-1 of a fly-back transformer 3. A high voltage produced in a conventional manner at a secondary winding 3-2 of fly-back transformer 3 is delivered through a high voltage rectifying circuit 4 to circuits (not shown) requiring high voltage. An automatic frequency control signal or voltage from an automatic frequency control circuit 5 is fed to horizontal oscillator 1 to control its oscillating frequency locked at a predetermined value required for synchronization of a television picture.

A negative pulse is obtained at a tertiary winding 3—3 of fly-back transformer 3. The negative pulse is applied to one end of a voltage divider consisting of a series connection of resistors 11 and 12. The other end of the voltage divider is supplied with a positive voltage $+B_L$ from a power source terminal 13.

The voltage dividing point of voltage dividing resistors 11 and 12 is connected to the cathode terminal of a diode 14. The anode terminal of diode 14 is connected to the anode terminal of a Zener diode 15. The cathode terminal of Zener diode 15 is connected to the base of a PNP transistor 16. The junction of Zener diode 15 and the base of transistor 16 is connected through a parallel combination of a bleeder resistor 17 and a capacitor 18 to power source terminal 13. A voltage obtained at the collector of transistor 16 is fed through a resistor 19 and added to the signal at the AFC terminal of oscillator 1.

Figure 2:
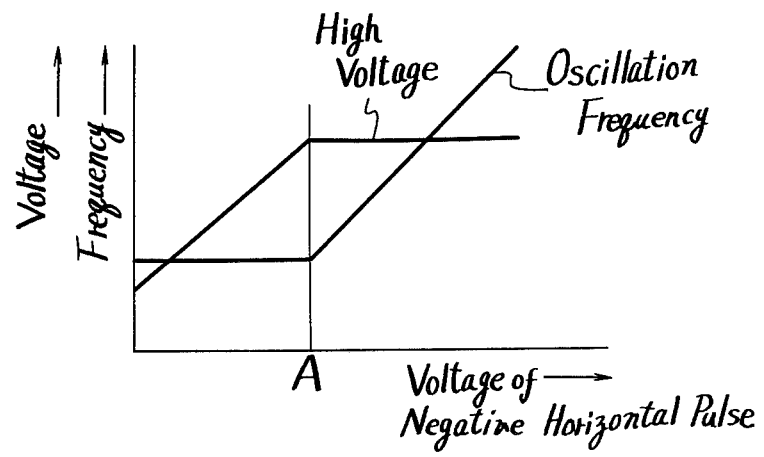
FIG. 2 is a graph to which reference will be made in explaining the operation of the embodiment of the invention shown in FIG. 1.

The amplitude of the negative pulse produced by tertiary winding 3—3 of fly-back transformer 3 is proportional to the amplitude of the positive high voltage pulse produced by secondary winding 3-2. In normal operation, the amplitude of the negative pulse from tertiary winding 3—3, voltage divided in voltage divider resistors 11 and 12, is too small to exceed the sum of the forward junction drop of diode 14, breakdown voltage of Zener diode 15 and base-emitter drop of transistor 16. Therefore, transistor 16 remains cut off and the frequency of horizontal oscillator 1 is locked to the required horizontal frequency. This is illustrated in FIG. 2. At levels of high voltage lower than a threshold level shown to the left of a vertical line A, the oscillation frequency of horizontal oscillator 1 remains constant indicating that it is properly controlled by automatic frequency control 5.

When negative voltage at the junction of voltage divider resistors 11 and 12 has sufficient amplitude to overcome the drops in diode 14 and Zener diode 15, the peak value of the excess of this voltage over the above drops is stored in peak detector capacitor 18 and the stored voltage is applied to the base of transistor 16. If the stored voltage is sufficiently negative to exceed the base-emitter drop of transistor 16, transistor 16 is turned ON. The positive voltage obtained at the collector of the transistor 16 is applied to the automatic frequency control terminal of horizontal oscillator 1 and is superimposed on the automatic frequency control voltage from the automatic frequency control circuit 5. as shown in the graph of FIG. 2, when the voltage of the negative pulse from the tertiary winding 3—3 exceeds a predetermined value A, voltage from transistor 16 assumes control of the frequency of horizontal oscillator 1 and increases its oscillating frequency. This unlocks horizontal synchronization of the television set to alert the viewer that a malfunction exists. In addition, since the trace time of the output of fly-back transformer 3 is shortened by the higher frequency but the fly-back time is constant, the duty ratio of the pulses from tertiary winding 3-3 and secondary winding 3-2 decrease with increasing frequency. The decrease in duty ratio therefore prevents or limits the amount of further increase in high voltage as shown to the right of the vertical line A in FIG. 2.

By performing the voltage-dividing of the negative pulse with respect to the positive power source at terminal 13, a Zener diode 15 having a small breakdown voltage can be used. This would not be the case if voltage-dividing were performed with respect to ground potential. Since the Zener voltage of Zener diode 15 can be small enough to be on the same order of magnitude as the base-emitter drop of transistor 16, temperature induced variations in Zener diode 15 and transistor 16 can compensate for each other. This would not be possible with a Zener diode having a large Zener voltage such as would be required if ground were used as a voltage reference rather than $+B_L$. Thus, the fact that the Zener voltage is low as in the present invention is very advantageous.

Further, in the invention Zener diode 15 has a junction capacitance, which reduces the need for a capacitor at the output side of diode 14.

In addition, with the present invention, the supply of high voltage continues even during the time that high voltage limiting is being performed. This permits checking the circuit to determine the cause of excessive high voltage.

The above description is given of a single embodiment of the invention, but it will be apparent that many modifications and variations could be effected by one skilled in the art without departing from the spirits or scope of the novel concepts of the invention, so that the scope or spirits of the invention should be determined by the claims.

I claim as my invention:

1. A high voltage limiting circuit for a television receiver comprising:
   a horizontal oscillator for providing an output pulse having a frequency controlled by an automatic frequency control voltage;
   an output circuit driven by said output pulse from said horizontal oscillator to provide an output pulse signal;
   a fly-back transformer having a primary winding receiving said output pulse signal from said output circuit, a secondary winding and a tertiary winding;
   a high voltage rectifying circuit connected to said secondary winding of said fly-back transformer;
   a source of a reference potential;
   a voltage divider connected between said tertiary winding and said source of reference potential;
   a constant voltage device; and
   a transistor having an emitter connected to said source of reference potential, a base connected to said voltage divider through said constant voltage device and a collector connected to add a voltage to said automatic frequency control voltage controlling said frequency of said horizontal oscillator; said tertiary winding of said fly-back transformer being wound to produce a negative pulse and said reference potential being a positive voltage whereby the added voltage is effective to control the frequency of said horizontal oscillator so as to reduce a high voltage obtained at said high voltage rectifying circuit when a voltage of said negative pulse exceeds a predetermined value.

2. A high voltage limiting circuit for a television receiver according to claim 1, wherein said constant voltage device is a Zener diode.

3. A high voltage limiting circuit for a television receiver according to claim 1 further comprising a capacitor connected between said emitter and base of said transistor.

4. A high voltage limiting circuit for a television receiver comprising: horizontal pulse means for producing a horizontal pulse having a variably controlled frequency; automatic frequency control means for producing an automatic frequency control voltage to control said frequency to a predetermined value; a fly-back transformer having at least a primary winding to which said horizontal pulse is fed, a secondary winding supplying the high voltage which is to be limited, and a tertiary winding providing a pulse having an amplitude related to said high voltage; a source of a reference potential; a voltage divider connected between said tertiary winding and said source of reference potential and having a voltage divider junction; a transistor having a base, emitter and collector; a constant voltage device connected between said voltage divider junction and said base of the transistor; said emitter of the transistor being connected to said source of reference potential; and a voltage at said collector of the transistor being applied to said horizontal pulse means together with said automatic frequency control voltage whereby said frequency is increased beyond said predetermined frequency when said high voltage exceeds a predetermined value.

5. A high voltage limiting circuit for a television receiver comprising: horizontal pulse generating means for producing a horizontal pulse having a variably controlled frequency; said horizontal pulse generating means having means for controlling said frequency so as to maintain the latter at a predetermined frequency in response to an automatic frequency control signal; fly-back means responsive to said horizontal pulse for generating a high voltage; means in said fly-back means for producing a pulse having a first polarity and an amplitude related to said high voltage; a source of a reference potential having a polarity opposite to said first polarity; divider means connected between said means for producing a pulse and said source of reference potential for producing a control signal when said amplitude exceeds a predetermined amplitude; a transistor having a collector-emitter path between said source of reference potential and said means for controlling said frequency, said transistor further having a base to which said control signal is applied and said transistor being effective to add a limiting signal to said means for controlling said frequency which is effective to increase said frequency above said predetermined frequency in relation to the amount by which the amplitude of said pulse exceeds said predetermined amplitude whereby said high voltage is limited.

* * * * *